June 23, 1964 D. NITZAN ETAL 3,138,788

MAGNETIC CORE BINARY COUNTERS

Filed March 15, 1962 4 Sheets-Sheet 1

INVENTORS:
DAVID NITZAN
WILLIAM K. ENGLISH
DAVID R. BENNION

Curtis, Morris & Safford
ATTORNEYS.

MAGNETIC CORE BINARY COUNTERS

Filed March 15, 1962 4 Sheets-Sheet 2

INVENTORS:
DAVID NITZAN
WILLIAM K. ENGLISH
DAVID R. BENNION

Curtis, Morris & Safford
ATTORNEYS.

MAGNETIC CORE BINARY COUNTERS

Filed March 15, 1962 4 Sheets-Sheet 3

INVENTORS:
DAVID NITZAN
WILLIAM K. ENGLISH
DAVID R. BENNION
Curtis, Morris & Safford
ATTORNEYS:

June 23, 1964 D. NITZAN ET AL 3,138,788

MAGNETIC CORE BINARY COUNTERS

Filed March 15, 1962 4 Sheets-Sheet 4

INVENTORS
DAVID NITZAN
WILLIAM K. ENGLISH
DAVID R. BENNION

Curtis, Morris & Safford
ATTORNEYS

United States Patent Office 3,138,788

Patented June 23, 1964

3,138,788

MAGNETIC CORE BINARY COUNTERS

David Nitzan, Palo Alto, and William K. English and David R. Bennion, Menlo Park, Calif., assignors to AMP Incorporated, Harrisburg, Pa., a corporation of New Jersey Filed Mar. 15, 1962, Ser. No. 179,945

9 Claims. (Cl. 340—174)

Figure 1:
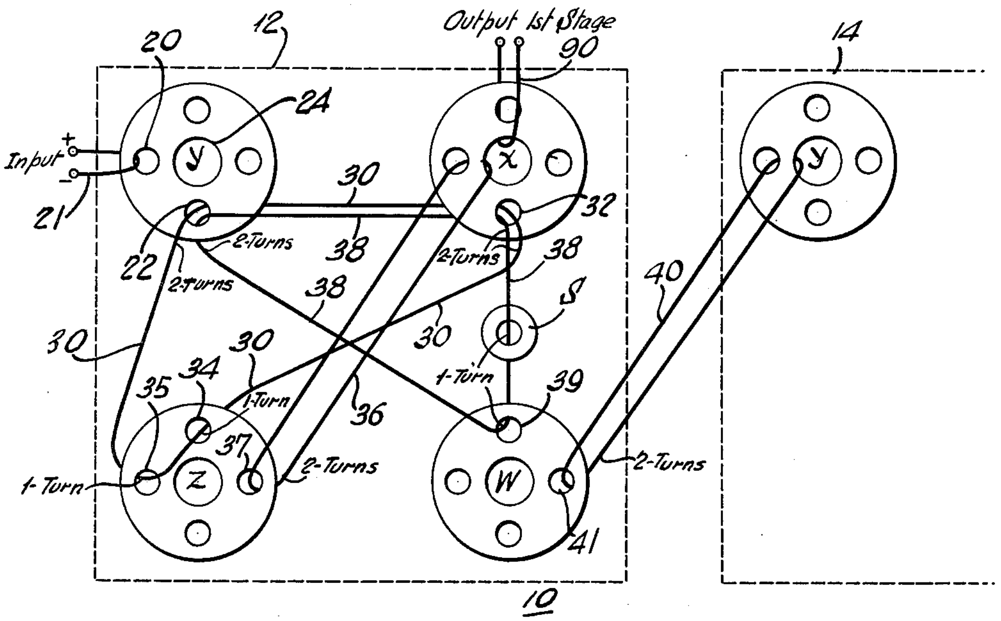

This invention relates to binary counters, and more particularly to such counters using magnetic cores and connecting wires only.

An object of this invention is to provide a magnetic core counter which operates over a wide range of conditions and which is simple and inexpensive to manufacture.

Another object is to provide such a counter which can be built from a standard type of core, using only a few cores per counter stage, and which can be energized with drive currents like those now used to energize other units.

These and other objects will in part be understood from and in part pointed out in the following description.

A binary counter is a device which receives input pulses and gives an output of one or more pulses representing in binary form the number of input pulses received. In a typical counter of this bind, there are a number of stages connected in series each stage representing a digit of a binary number. Thus a four stage counter is capable of counting up to four binary digits, which corresponds to a maximium decimal input of 16.

In U.S. Patent 2,995,731 there is described a shift register wherein a number of multi-aperture magnetic cores (MAD's) of square loop ferrite material are connected in series, the output of one core being coupled by a simple turn of wire to the input of the next, and so on. The cores are arranged in even and odd groups and are driven by respective advance and prime currents applied to the cores in predetermined sequence. A binary one is stored in a core in the form of magnetic flux saturating a portion of the core in one direction, and a zero, by magnetic flux in the opposite direction. In the course of advancing a binary one along the register, the one is shifted from an odd core to the next core, which is an even core, and from thence to the next odd core, this sequence comprising a complete clock cycle.

This type of MAD core circuit, in addition to its low cost, has the important advantages of extreme reliability and the ability to operate over a very wide range of temperature and drive currents. The present invention aims to provide binary counters having the advantages of and essentially the same wide operating range as this shift register.

In accordance with the present invention, in one specific embodiment thereof, four MAD cores are connected together to form one stage of a binary counter, another four cores being connected in similar fashion for the next stage and so on. The MAD cores are identical to each other, which means an important saving in manufacturing cost, and they are connected together in such a way that each operates in much the same way as the cores in the aforesaid shift register. Thus, the same type of drive currents and clock cycle used for a shift register can be used with this counter. Moreover, it has stable operation over approximately the same wide temperature range as has the shift register.

Figure 2:
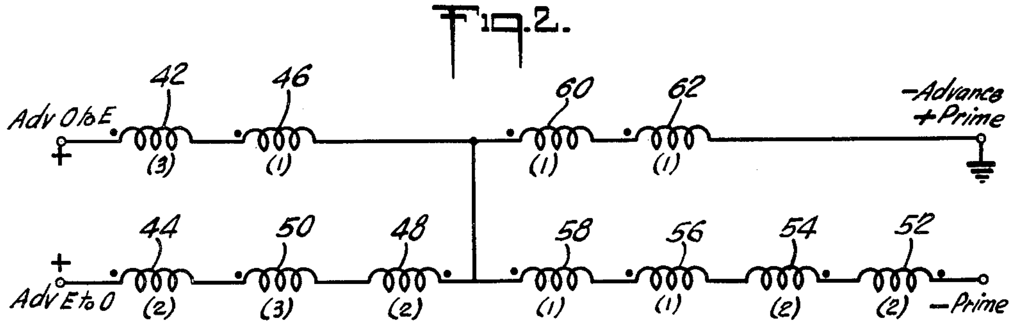
Figure 3:
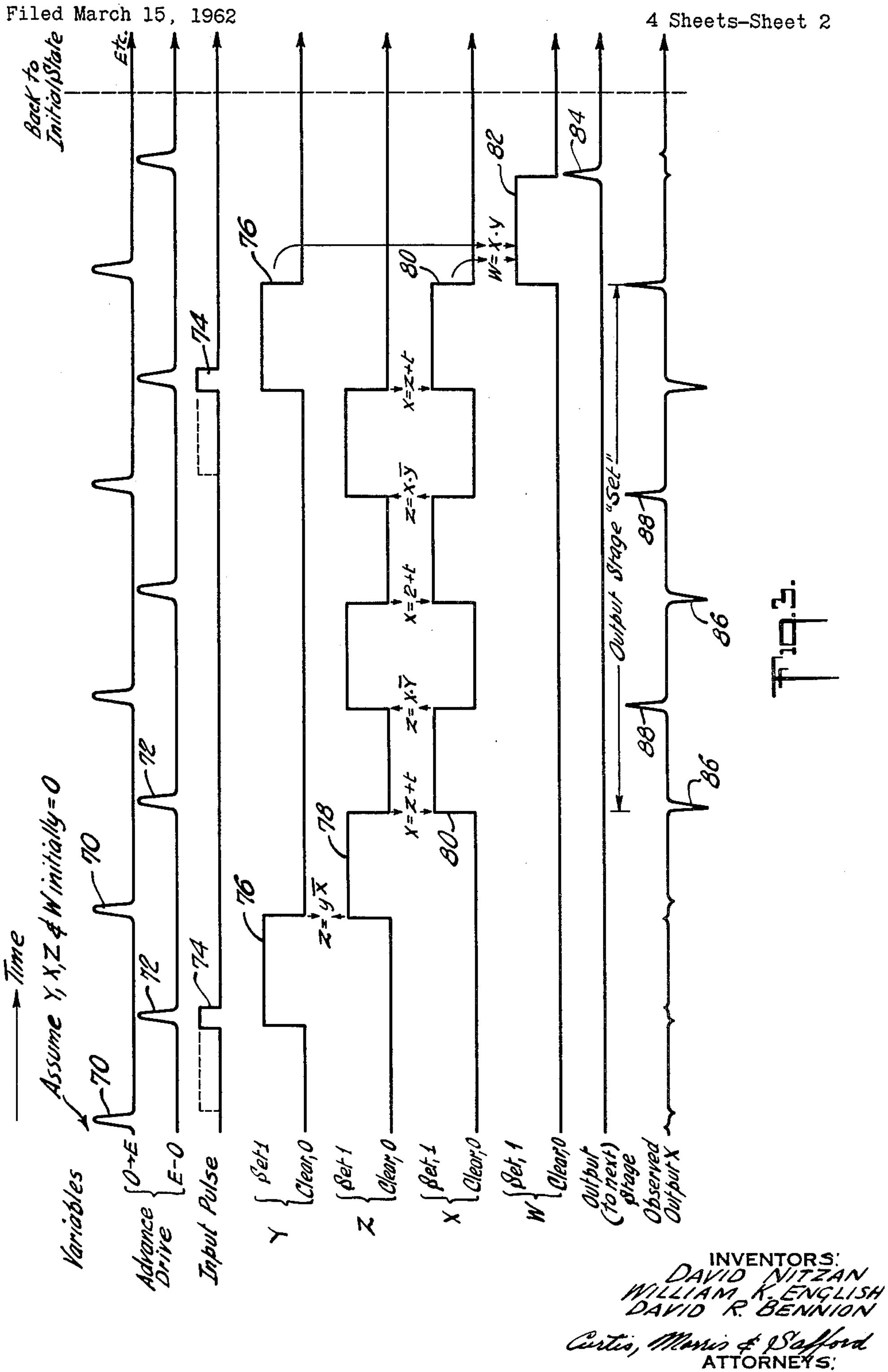
Figure 4:
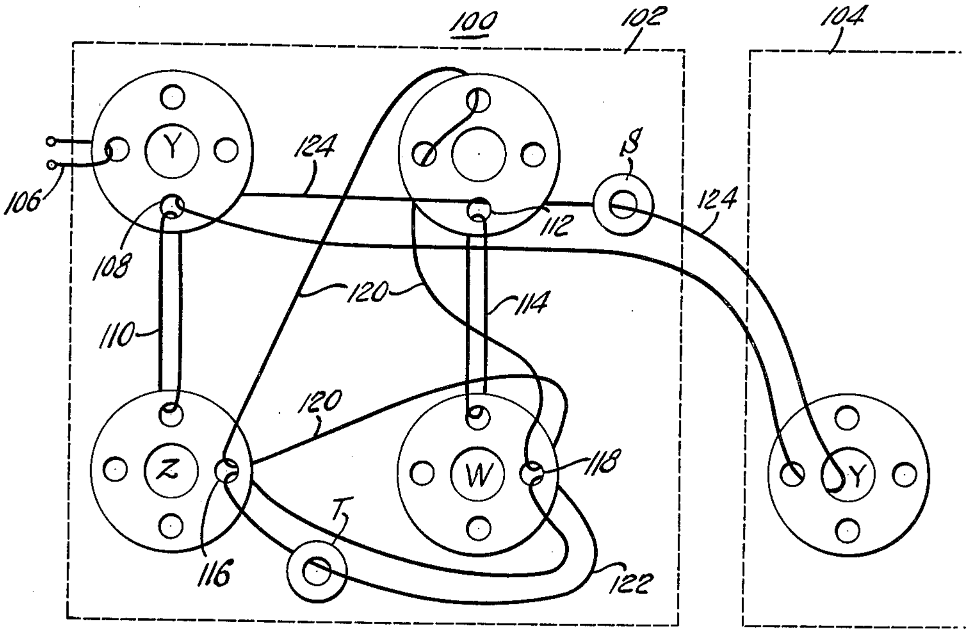
Figure 5:
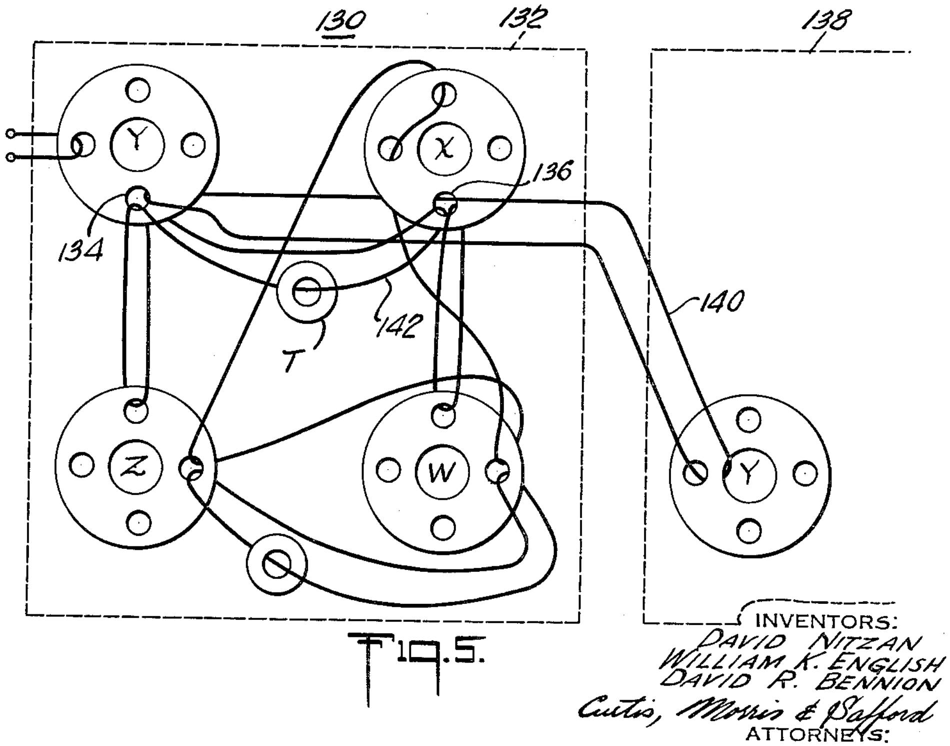
Figure 6:
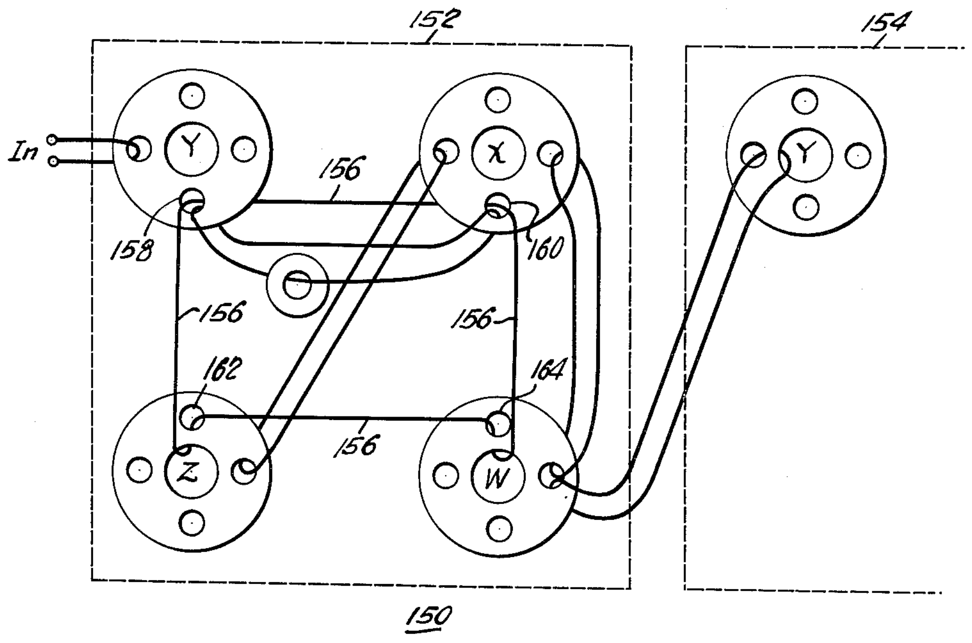

A better understanding of the invention together with a fuller appreciation of its many advantages will best be gained from the following description given in connection with the accompanying drawings wherein:

FIGURE 1 is a schematic circuit of one embodiment of binary counter in accordance with the invention; the drive windings not being shown here, FIGURE 2 shows the respective drive windings for the cores of the counter, FIGURE 3 is an operation time sequence diagram of the counter of FIGURE 1, FIGURE 4 is a schematic circuit of another embodiment of the invention, FIGURE 5 is a schematic circuit of still another embodiment of the invention; and FIGURE 6 is a schematic circuit of a further embodiment of the invention.

The counter 10 in FIGURE 1 comprises a first stage 12, and an identical second stage 14 (only a portion of which is shown). It is to be understood of course that as many additional stages as desired can be connected in sequence in the same way.

Counter stage 12 includes four MAD cores designated Y, X, Z and W, respectively. Core Y, which receives the input pulses to be counted, has a minor aperture 20 which is threaded with an input winding 21. Pulses of current are applied to this winding in direction and amplitude such that for each the outer leg of the core at aperture 20 will be saturated with flux in the counter-clockwise direction, i.e. the core set with a binary one.

At the beginning of a count operation, the four MAD cores of stage 12 are in the clear or zero condition, that is, saturated with flux in the clockwise direction. Then on the occurrence of the first input pulse applied to winding 21 of core Y, a binary one is set into this core. This causes the flux around a minor output aperture 22 of the core to be set locally around this aperture in the clockwise direction. Upon the application of a suitable priming current applied through its aperture 22, the flux locally circulating about the aperture is reversed to the counter-clockwise direction. Thereafter, the clearing of core Y by a drive current applied through its central or major aperture 24 returns the flux in the core to saturation in the clockwise direction. This causes the reversal of flux in the outer leg of the core at minor aperture 22 and induces a current in each of the output windings encircling this leg. This action of setting, priming, and then clearing or advancing the flux in core Y is the same as for the MAD cores used in the shift register described above.

One of the windings threading minor aperture 22 of core Y is a coupling winding 30. This also threads, in the relative senses shown, a minor output aperture 32 of core X and two minor input apertures 34 and 35 of core Z. Cores X, Y and Z are coupled in an "exclusive or" arrangement so that core Z will be set with a binary one only when core Y but not X, or core X but not Y, transmits a one. A binary one set into core Z during one cycle is transmitted to the next cycle to core X by means of a coupling winding 36 threading a minor output aperture 37 of core Z and a minor input aperture of core X, as shown.

A second winding threading minor aperture 22 of core Y is a coupling winding 38. This winding also threads, in the senses shown, minor aperture 32 of core X, an auxiliary toroidal magnetic core S, and a minor input aperture 39 of core W. Cores X, Y and W are connected in an "and" circuit so that core W will be set with a one only when cores X and Y both transmit a binary one. Auxiliary core S, during the transmission of a one from core X or Y, serves to induce in coupling winding 38 a voltage effectively equal and opposite to that induced by core X or core Y. When both cores transmit together, two units of voltage are induced in winding 38 by them and one unit of voltage in the opposite direction is induced by core S. Therefore, one unit of voltage in the proper polarity remains to set a binary one into core W. Core W transmits to the Y core of the next stage (stage 14) by means of a coupling winding 40 threading its minor output aperture 41.

Cores Y and X are cleared, i.e. set to zero state each advance 0 to E cycle by means of a current pulse applied to a winding 42 (see FIGURE 2) threading the major apertures of the cores. Similarly cores Z and W are cleared on each advanve E to 0 cycle by pulses applied to a winding 44 threading their major apertures. Advance 0 to E and E to 0 windings 46 and 48 both thread auxiliary core S. Finally, a holding winding 50, in series with windings 44 and 48, threads minor apertures 22 and 32 of cores Y and X. The relative senses of these windings, and the others shown in FIGURE 2, are indicated by a respective dot at one end of each. The relative number of turns of each winding is given by the numbers in parentheses.

The minor output apertures 22 and 32 of cores Y and X are primed by means of windings 52, 56, and 60. Similarly, minor output apertures 37 and 41 of cores Z and W are threaded by prime windings 54 and 62. The major apertures of cores Y and X are threaded by a reverse prime winding 56 and the major apertures of cores Z and W by a reverse prime winding 58. Connected in a common leg to ground with the advance and prime windings is first winding 60 which threads minor apertures 22 and 32 of cores Y and X and second winding 62 which threads minor apertures 37 and 41 of cores Z and W.

FIGURE 3 illustrates a counting operation of stage 12. Shown on the first two lines of the diagram are advance drive current pulses 70 and 72. For the sake of simplicity, a steady direct current is assumed to be applied to the prime windings of the circuit. Also the MAD cores are assumed to be initially in the clear or zero state. When a first input pulse 74 occurs as indicated in the third line, core Y will be set with a binary one, as indicated at 76 in the fourth line of the diagram. On the occurrence of the next advance 0 to E pulse 70, the one stored in core Y is transmitted to core Z, as indicated at 78 in line five. When the next advance E to 0 pulse 72 occurs, core Z is cleared and transmits a one to core X, as indicated at 80 in the sixth line. Thereafter, until another input pulse 74 is received, a binary one will be transmitted to and from cores X and Z.

When the next input pulse 74 occurs, core Y will again be set. But since, as can be seen from lines four and six of the diagram, core X is now also set, both cores will transmit a one when the next advance 0 to E pulse 70 occurs. This, as explained previously, will cause a one to be set into core W as indicated at 82 in line seven of the diagram. Now, with core W set, it will on the next advance E to 0 pulse 72 transmit a pulse 84 to the Y core of the next stage, here stage 14. Thus, after receiving two input pulses, each counter stage will transmit a pulse to the next stage (or to an output device).

As seen in the last line of FIGURE 3, when core X is set with a one and then cleared, a pair of pulses 86 and 88 are generated. These pulses are obtained, as seen in FIGURE 1, by an output winding 90 coupled to core X. They indicate that counter stage 12 has been set with a single input pulse. As such they provide parallel readout from the stage.

It will be noted from FIGURE 3 that circuit 10 counts up, that is, starting from an all zero state, the stages progress to an all set, or binary one, state. At least two complete drive current cycles are required to propagate a binary one from stage 12 (assuming two input pulses are applied to the stage during these intervals) to stage 14, and so on.

One of the important advantages of circuit 10 is that the effect on core X (or Y) of circulating current in coupling winding 30 induced by prime drive current applied to minor aperture 22 (or 32) is inherently nullified. This is brought about by a similar current induced in coupling winding 38, by the prime drive current, this winding threading apertures 22 and 32 in the same sense whereas coupling winding 30 threads them in opposite sense. If the effect of this induced current in winding 30 were not countered, the permissible range of prime drive current would be greatly reduced.

FIGURE 4 shows another embodiment of the invention. Here a counter 100 has a first stage 102, a second stage 104, and so on. Stage 102 is very similar to stage 12 of counter 10, but here, among other differences, the Y core of second stage 104 is driven by advance E to 0 drive currents. Thus, the positions of the X and Y cores have been interchanged with the respective positions of the W and Z cores in stage 104. The rate of propagation here is twice that for counter 10.

In stage 102, the Y core, which has an input winding 106, transmits from a minor output aperture 108 to core Z by a simple coupling winding 110. Similarly, the X core transmits from a minor output aperture 112 to core W via a simple coupling winding 114. Cores Z and W in turn transmit from respective minor apertures 116 and 118 to core X via an "exclusive or" winding 120. To eliminate the effect of current induced in the latter winding by prime drive current, an auxiliary winding 122 is threaded through apertures 116 and 118 in the senses shown. This winding drives an auxiliary toroidal core T. Finally, cores Y and X transmit to the Y core of stage 104 by means of an "and" coupling winding 124 threading minor apertures 108 and 112 and core Y of stage 104. This winding also threads a core S, whose purpose is the same as core S in counter 10.

Assuming all the cores are in zero condition, after core Y of stage 102 receives an input pulse and is set with a one, it will thereafter transmit a one to core Z. On the next half cycle core Z will transmit a one to core X. Assuming that another input pulse has not yet been received, core X will on the next half cycle, only transmit to core W. Thereafter, cores W and X will transmit a one back and forth between themselves until another input pulse is received. When this happens core Y, of course, will be set, and thereafter both it and core X will transmit via "and" coupling winding 124 to the Y core of stage 104. Though the advance and prime drive windings of counter 100 have not been shown, it will be understood that they are closely similar to the corresponding ones of counter 10. Core T is cleared by the advance 0 to E drive current pulses.

FIGURE 5 shows a counter 130 which is very similar in layout to counter 100. Here, cores X and Y of the first stage 132 are coupled through their respective minor output apertures 134 and 136 to the Y core of stage 138 by a coupling winding 140. This winding is like an "exclusive or" winding in that it threads apertures 134 and 136 in opposite senses, but it threads only a single input aperture of the Y core of stage 138. This winding serves to set a one into this Y core only if core Y of stage 132 transmits a one and core X of stage 132 does not. Core Y of stage 138 will not be set when core X of stage 132 transmits a one. Since winding 140 looks like an "exclusive or" winding so far as apertures 134 and 136 are concerned, an auxiliary winding 142 threading these apertures and an auxiliary core T are provided. This core T is cleared by the advance E to 0 drive current pulses. Remaining windings and elements of counter 130 are the same as the corresponding parts of counter 100.

Counter 130 operates in a way similar to counter 100. Here, however, with the first input pulse, and after the circuit has reached equilibrium, i.e. the binary one has been fully propagated, all of the X cores of the counter will be set with a binary one. Thereafter, the count is down, i.e. the X cores of the respective stages will be returned to zero state one by one in accordance with the count of input pulses.

FIGURE 6 shows a counter 150 having a first stage 152 and a second stage 154. This counter also counts down. Here, cores Y and X are coupled to cores Z and W by a four-sided coupling winding 156 threading in the senses shown a minor aperture 158 of core Y, a minor output aperture 160 of core X, a minor input aperture 162 of core Z, and a minor input aperture 164 of core W. When core Y, but not core X, transmits a one a current will flow in winding 156 which sets a one into core W. Core Z will not be set. On the other hand, when core X transmits a one, but not core Y, core Z, but not core W, will be set.

When an input pulse is received at the beginning of a counting operation, core Y will be set and will subsequently transmit to core W. The latter will then transmit to core X and to the Y core of stage 154. Core X of stage 152 will in turn transmit to core Z. Core Z will, in its turn, transmit back to X, and so on until another input pulse is received. When another such pulse is received, and assuming a one is then stored in core X, cores Y and X will both try to transmit on the next advance 0 to E drive current. But this results in neither core W nor core Z being set with a one. Consequently, all of the MAD cores of stage 152 are returned to zero state. Thereafter, the next input pulse sets another one into core Y, and the above sequence is repeated, and so on.

The above description is intended in illustration and not in limitation of the invention. Various changes in the embodiments described may occur to those skilled in the art and these may be made without departing from the spirit or scope of the invention as set forth.

We claim:

1. A magnetic core binary counter comprising: four MAD cores, each of which has a central major aperture and at least one minor aperture, an "exclusive-or" coupling winding threading a minor output aperture of a first core and of a second core and threading a pair of input minor apertures of a third core, an "and" coupling winding threading said minor output apertures of said first and second cores and threading an input aperture of a fourth core, a coupling winding threading an output minor aperture of said third core and an input aperture of said second core, means to set a binary one into said first core, and drive current means for clearing said cores and for priming said output minor apertures thereof.

2. The counter in claim 1 wherein said four cores comprise one stage of the counter, and a coupling winding from said fourth core to the first core of another stage.

3. The counter in claim 1 wherein an auxiliary magnetic core encircles said "and" winding, said auxiliary core being energized by said drive current means.

4. The counter in claim 1 wherein said "exclusive-or" winding threads said output minor apertures of said first and second cores in opposite sense, and threads said pair of input minor apertures in opposite sense relative to each other.

5. A magnetic core binary counter stage comprising X, Y, Z and W MAD cores, each core having a large central major aperture and at least one minor output aperture through the body of the core, said cores being substantially identical to each other, input means for setting a binary one into said Y core, a first coupling loop threading a minor output aperture of said core and of said X core and threading a pair of input minor apertures of said Z core in an "exclusive-or" configuration, a second coupling winding threading said minor output apertures of said Y and X cores and an input aperture of said W core in an "and" configuration, a third coupling loop threading an output minor aperture of said Z core and an input aperture of said X core, advance 0 to E drive means threading the major apertures of said Y and X cores, advance E to 0 drive means threading the major apertures of said Z and W cores, and priming drive means threading said output minor apertures.

6. The arrangement in claim 5 wherein said W core has a minor output aperture and a fourth coupling loop threading said output aperture and an input aperture of the Y core of another stage.

7. The arrangement in claim 5 wherein an output winding threads said X core.

8. A magnetic core binary counter comprising: a first stage including four MAD cores, each of which has a central major aperture and at least one minor aperture, a first coupling winding threading a minor transmitting aperture of a first core and of a second core and threading at least one receiving minor aperture of a third core, a second coupling winding threading a minor transmitting aperture of said third core and a receiving aperture of one of said four cores, and a third coupling winding threading a transmitting aperture of at least one of said cores to provide an output from said stage to a utilization point.

9. A magnetic core binary counter comprising: a plurality of multi-aperture magnetic cores, each of which has a major aperture and at least one minor aperture, an "exclusive-or" coupling winding threading a minor output aperture of a first core and the minor output aperture of a second core and threading a pair of input minor apertures of a third core an "and" coupling winding threading said minor output apertures of said first and second cores, a coupling winding threading an output minor aperture of said third core and an input aperture of said second core, means to set a binary one into one of said cores, and drive current means for clearing said cores and for priming said output minor apertures.

No references cited.